United States Patent

Dollenmayer

[15] 3,695,741

[45] Oct. 3, 1972

[54] MINATURE DISC DICTATION MACHINE FEATURING INTEGRAL DISC STORAGE

[72] Inventor: William L. Dollenmayer, Lexington, Ky.

[73] Assignee: International Business Machines Corporation, Armonk, N.Y.

[22] Filed: Dec. 18, 1970

[21] Appl. No.: 99,567

[52] U.S. Cl. ..............312/10, 206/16 BC, 179/100.4

[51] Int. Cl. ..............................................A47b 81/06

[58] Field of Search........................312/8–10, 12, 15; 221/6, 122, 133; 206/16 B, 16 BC, 16 C; 179/100.4 R

[56] References Cited

UNITED STATES PATENTS

| | | | |
|---|---|---|---|
| 2,523,340 | 9/1950 | Bonsall | ...............179/100.4 R |
| 2,165,713 | 7/1939 | Lehman | .........................312/8 |
| 1,719,586 | 2/1931 | Todd | .................206/16 BC X |
| 2,573,671 | 10/1951 | Muros | ..........................221/6 |

*Primary Examiner*—James C. Mitchell
*Attorney*—Hanifin & Jancin and D. Kendall Cooper

[57] ABSTRACT

A miniaturized dictation machine has complete facilities for recording and reproducing sound from a magnetic disc record medium. The machine features an integrally formed storage area comprising a compartment for unrecorded discs and a compartment for recorded discs with separator, guide, and eject means.

2 Claims, 30 Drawing Figures

INVENTOR
WILLIAM L. DOLLENMAYER

BY D. Kendall Cooper

ATTORNEY

PATENTED OCT 3 1972 3,695,741

MINATURE DISC DICTATION MACHINE FEATURING INTEGRAL DISC STORAGE

CROSS-REFERENCES TO RELATED APPLICATIONS

U. S. Pat. application Ser. No. 99,568, filed Dec. 18, 1970, having W. L. Dollenmayer as inventor and entitled "Miniature Disc Dictation Machine Featuring Absolute Synchronized Disc-Transducer Driving Arrangement" (Refer to as "Driving" application).

BACKGROUND OF INVENTION AND PRIOR ART

| | |
|---|---|
| 2,706,118 | 3,038,037 |
| 2,793,864 | 3,046,357 |
| 2,866,009 | 3,050,595 |
| 2,866,010 | 3,078,305 |
| 2,894,700 | 3,078,464 |
| 2,952,747 | 3,237,952 |
| 2,989,261 | 3,409,746 |

The foregoing patents are considered representative of recording-reproducing machines in the prior art and are not deemed anticipatory of the present invention. Of further interest is the portable dictation machine, designated the IBM Model 224 dictation unit, as described in the IBM Technical Disclosure Bulletin, November, 1969, Vol. 12, No. 6, pages 786 and 787.

SUMMARY OF THE INVENTION

The present invention concerns a miniaturized portable dictation unit having recording and reproducing facilities and accommodating a small magnetic disc member on the order of 2-½ inches in diameter. The disc member is coated on both sides with an oxide layer on a Mylar* (*Trademark, E. I. du Pont de Nemours & Co.) substrate, and recording is done by establishing flux patterns representative of audio signals on the disc. Other disc configurations can be used as well. Recording occurs in a spiral pattern on the disc from the outside toward the inside. Using the principles taught herein, it is possible to construct a dictation unit with a wide range of features that weighs in the order of 6 oz. or less. As will be described in detail, track spacing on the disc is such that each side of the disc accommodates approximately five minutes of recording time.

The dictation unit incorporates storage facilities for a large number of discs, such facilities being integral with the housing of the dictation unit.

OBJECTS

A primary object of the present invention is to provide a dictation unit of extremely small size, thereby permitting its use under diverse circumstances, as well as easy transportability.

Another object of the present invention is to provide a miniaturized dictation unit accommodating disc recording members and having all major facilities incorporated therein in an extremely compact fashion.

A further object of the present invention is to provide a dictation machine of small size utilizing a magnetic disc member with complete facilities for recording and reproducing signals on the disc.

Also, an object of the present invention is to provide a dictation machine having an integral storage unit with provision for loading and ejecting disc recording members in a convenient fashion.

Still another object of the present invention is to provide a dictation unit having a record member storage facility as an integral portion of the housing of the machine.

A final object of the present invention is to provide a miniaturized portable dictation unit housing all mechanical and electrical facilities in a single compact housing and further operable from self-contained battery sources.

The foregoing and other objects, features, and advantages of the invention will be apparent from the following more particular description of several embodiments of the invention as illustrated in the accompanying drawings.

DRAWINGS

Figure 4:
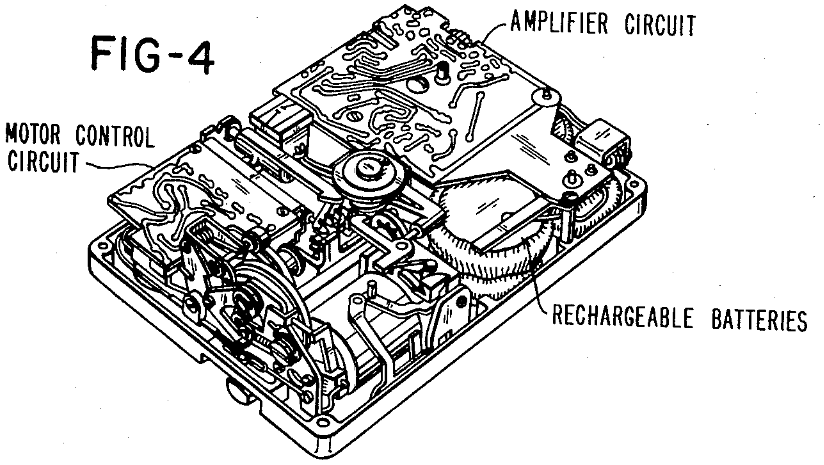
Figure 5:
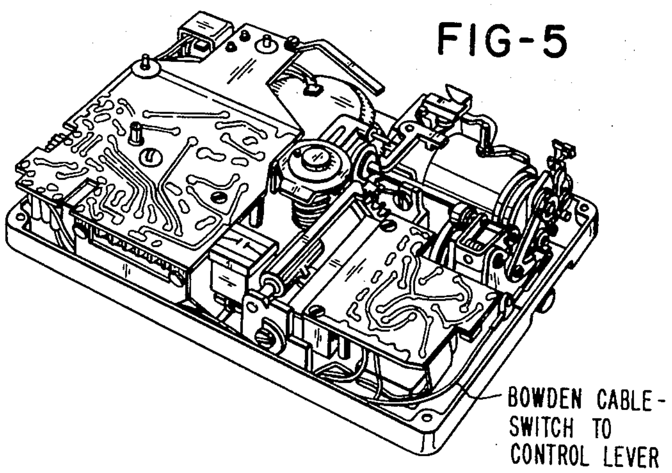
Figure 6:
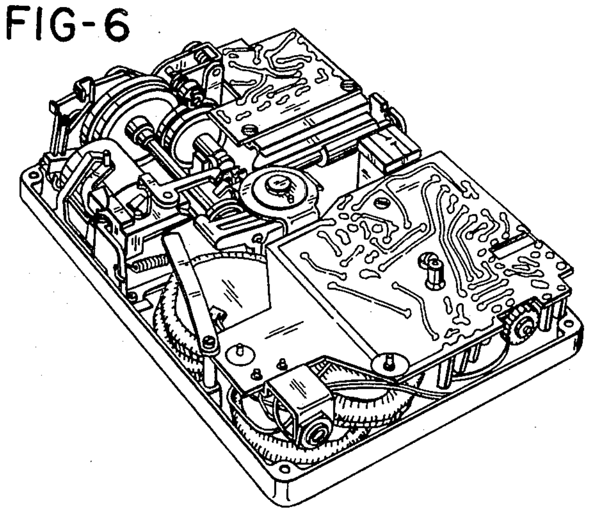

FIGS. 4, 5, and 6 illustrate a typical dictation unit shown in FIGS. 1 and 2 with covers off to reveal internal structures and circuits.

Figures 7, 8A, 8B, 8C:
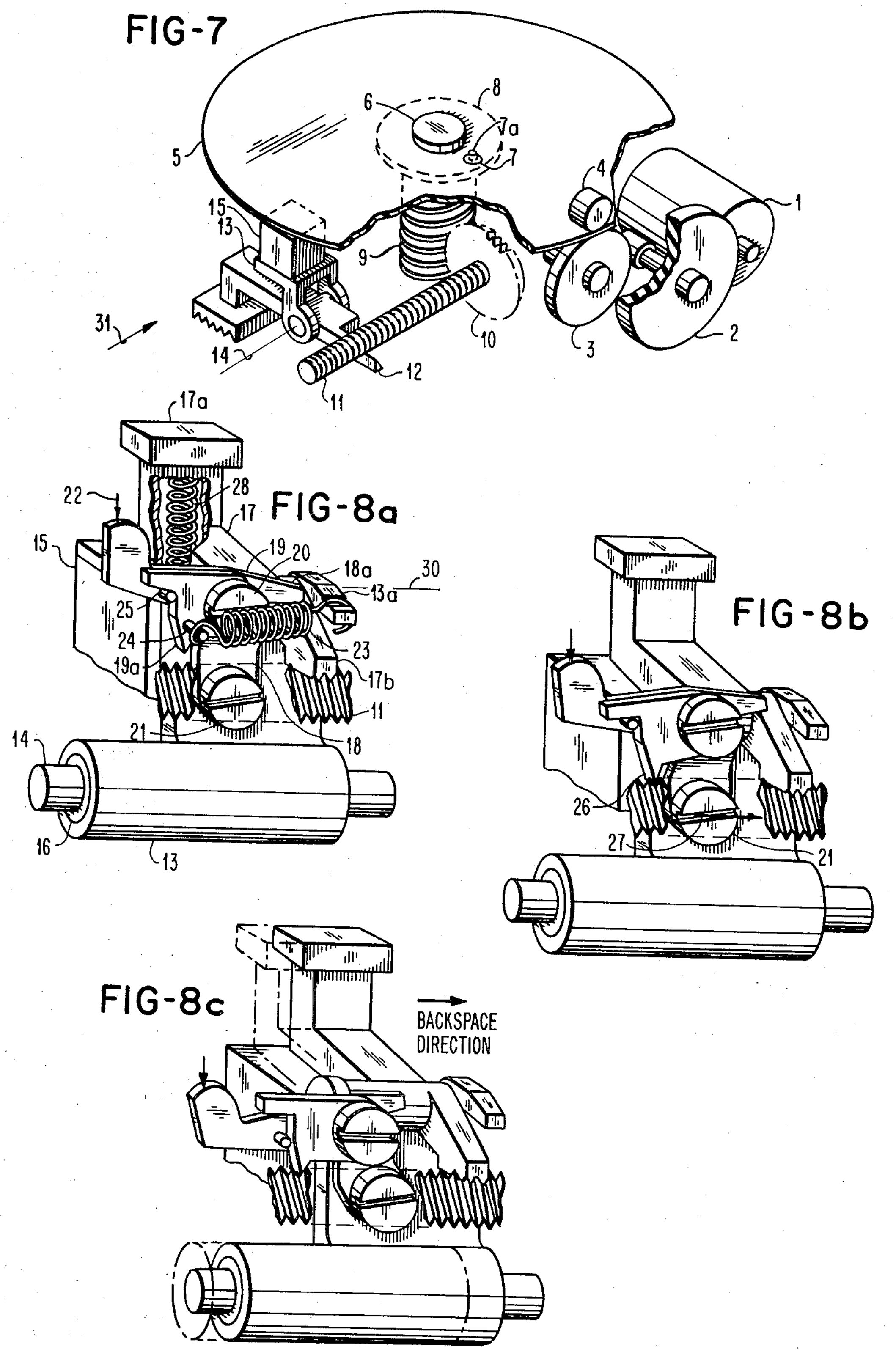

FIG. 7 illustrates the unique disc and sound head driving structures in the portable dictation unit.

FIGS. 8*a*, 8*b*, and 8*c* illustrate various conditions of the incrementing structures in the portable dictation unit under a number of conditions of operation.

Figure 9:
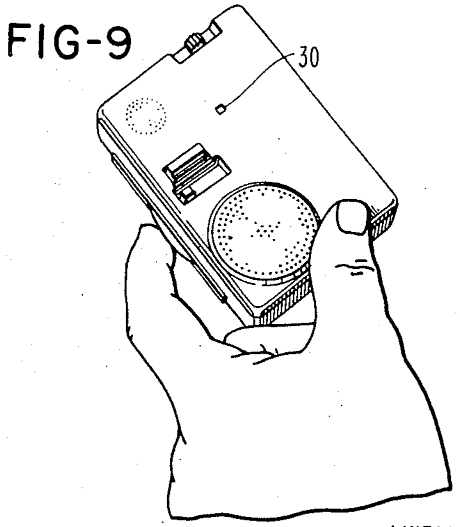
Figure 10:
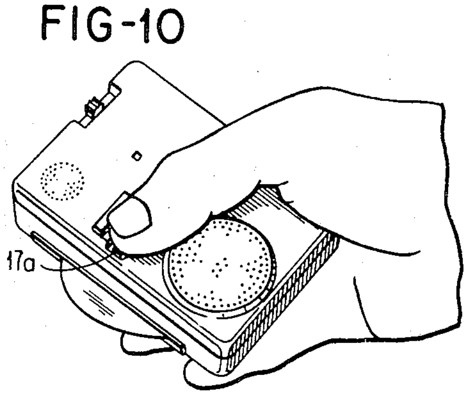

FIGS. 9 and 10 illustrate how a disc is inserted in the portable unit and ejected, respectively.

FIGS. 11, 12, 13*a*, 13*b*, 13*c*, and 13*d* illustrate various structures in the portable dictation unit for accomplishing the driving of the disc upon insertion in the machine.

Figure 14:
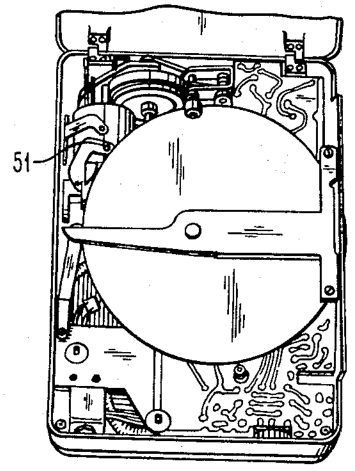

FIG. 14 illustrates one phase involved in disc loading.

Figure 15:
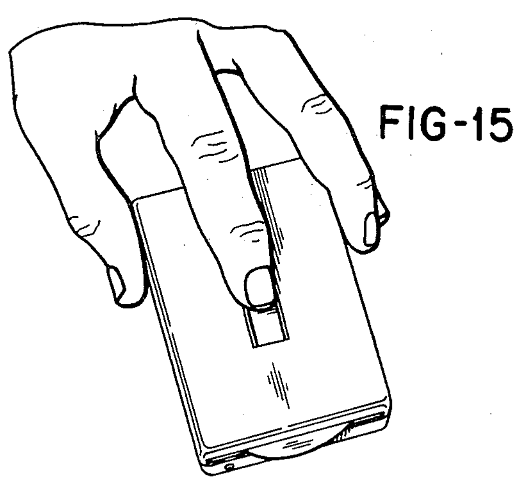
Figure 16:
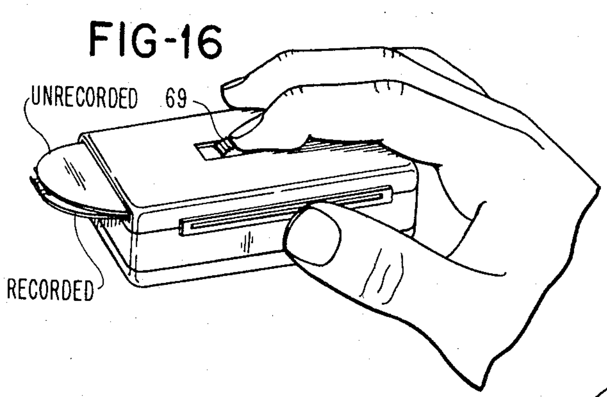
Figure 17:
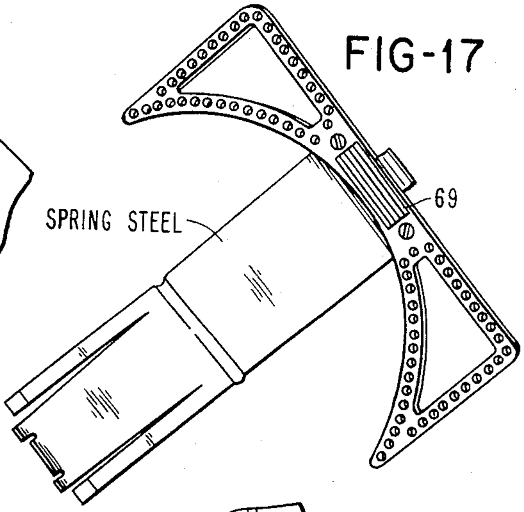
Figure 18:
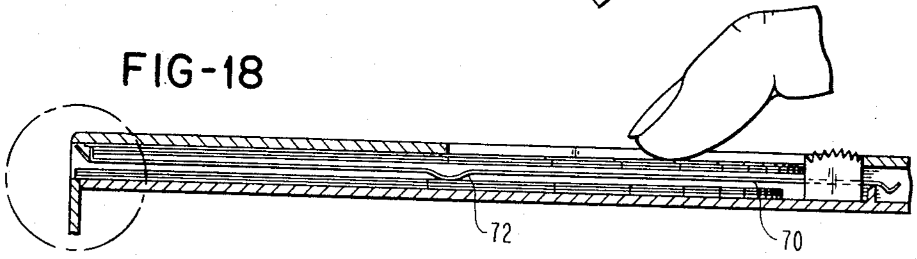
Figure 18A:
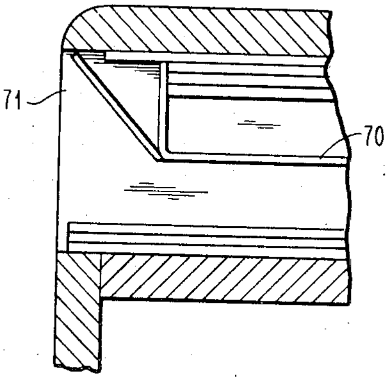

FIG. 15 shows one phase of disc ejection from storage, while FIG. 16 illustrates how all discs in storage may be ejected and separated simultaneously, FIGS. 17 and 18 illustrate further structures in the disc storage facility forming a portion of the housing of the dictation machine.

Figure 19:
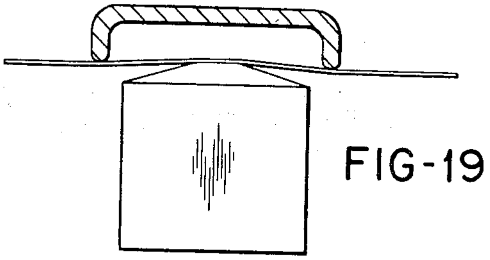
Figure 20:
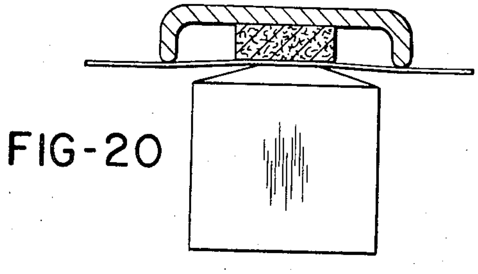

FIGS. 19 and 20 illustrate a pressure pad that is useful in insuring firm contact between the disc record member and the sound head in the dictation machine.

DETAILED DESCRIPTION

Miniature Disc Dictation Machine

Figure 1A:
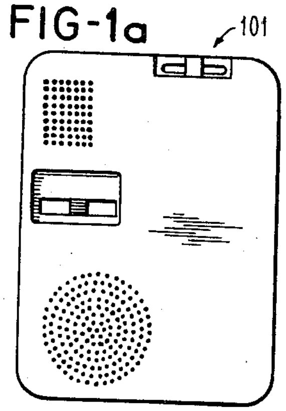
FIG. 1 represents three versions of the miniaturized portable dictation machine according to the present invention.
Figure 1B:
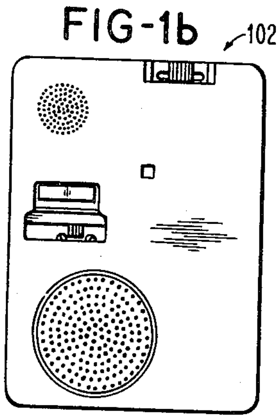
Figure 1C:
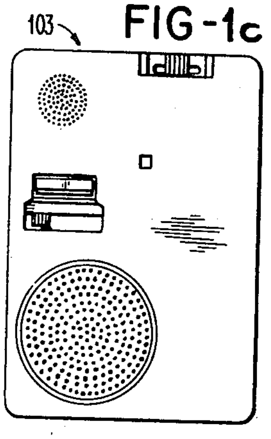
Figure 2A:
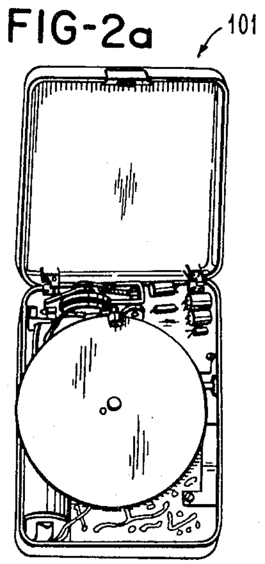
FIG. 2 illustrates the dictation machines of FIG. 1 with covers open to reveal the disc recording medium and other internal circuits and mechanisms.
Figure 2B:
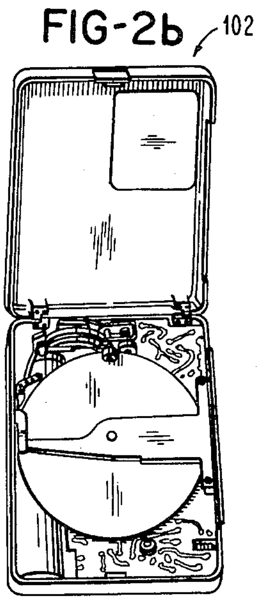
Figure 2C:
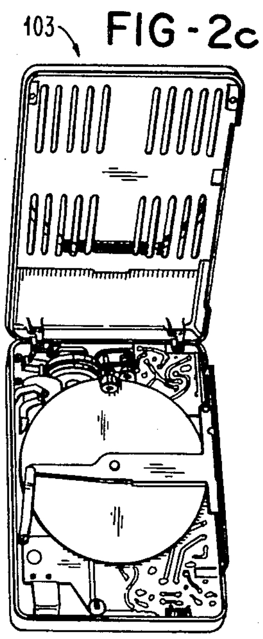

FIGS. 1*a*, 1*b*, and 1*c* illustrate three versions of the miniature disc dictation machine. These are designated 101, 102, and 103, respectively. Each of the units 101, 102, and 103 is also shown in FIGS. 2*a*, 2*b*, and 2*c*, respectively, with covers open to reveal some of the internal mechanisms including the record medium which, in this case, is a small magnetic disc shown in greater detail in FIG. 3.

Medium

Figure 3:
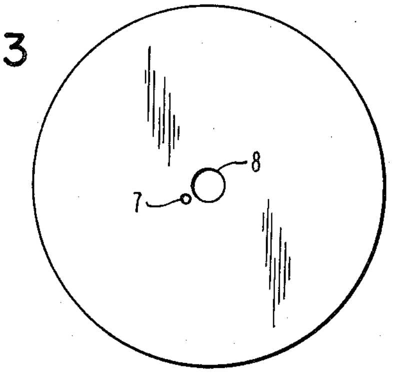
FIG. 3 illustrates a disc member useful in the machines in FIGS. 1 and 2.

This is a miniature disc approximately 2-½ inches in diameter. It can have oxide on either one or both sides and can be recorded on either or both sides. The discs, which are preferably flexible, may comprise a Mylar substrate 0.003 to 0.004 inches thick. The disc has a main centering aperture 8 as shown in FIG. 3 and a small auxiliary aperture 7. The second aperture is for positioning the disc angularly for correct phasing. The main aperture 8 is the only aspect of the disc that must be held to critical dimensions, because it is the primary means of positioning the disc. By referencing from a single aperture, maximum possible registration is obtained with least effort, hence, one of the major advantages of the disc.

Recording Pattern

Recording is in a classical spiral pattern on the disc from the outside toward the inside. There is no technical reason why the direction of travel could not be reversed.

Recording of a constant track width presently is done with a recording head that records a track 0.006 inches wide and a track spacing of 0.0083 inches from a maximum diameter of 2.25 inches to 1.0 inches.

Recording Speed and Time

A constant linear record velocity is approximately 1.4 inches/second with a recording time of approximately 5 minutes on each side of the disc.

Philosophy of Recording Technique

The constant linear velocity approach is used as opposed to constant angular velocity in order to get the maximum possible recording time with the least technical difficulties and with a minimum of development effort.

Since over 50 percent of the diameter of the disc is used for recording, had constant angular velocity recording been used, the head-to-disc speed change would have been better than 2 to 1, making it necessary to have the equalization, gain and biasing of the amplifier, and electronics vary radially with the magnetic head position on the disc.

With the constant linear velocity (or constant head-to-disc velocity), it is necessary to speed up the rotational velocity of the disc as the head traverses radially inward. This is accomplished by speeding up the motor as the magnetic head traverses radially inward. The head position controls a linear potentiometer which, with a so-called "derived circuit," operates a D.C. tachless motor to control the disc speed. The necessary motor control circuitry may be like that shown in U. S. Pat. application Ser. No. 877,723, now U.S. Pat. No. 3,568,027 filed November 18, 1969, with G. L. Bacon and G. W. VanCleave as inventors, and entitled "Motor Control Circuit with Symmetrical Topology."

Electronics

FIGS. 4, 5, and 6 comprise various views of the machine with the covers removed to show how the electronics, including solid state components and all other components are closely packaged together.

Magnetic Recording Head

The machine uses a miniature dual gap, two-ring head. This is necessarY for error-free recordings, but is should be understood that a single-gap head can also be used and the disc erased outside the machine.

Batteries

Both throw-away and rechargeable batteries are used in the machines.

Same Unit for Office

The machine serves both as a portable and office machine. However, its flexibility, size, convenience, and weight are such that people will more likely carry the machine with them and use it as a portable unit.

Method of Driving the Disc and Recording Head

As set forth in the Dollenmayer "Driving" application, FIG. 7, demonstrates the method of driving the disc. Motor 1 drives reduction stage 2 2 which drives idler stage 3 which, by means of pinch roller 4, drives the rim of disc 5. Disc 5 in turn, drives spindle 6 by means of phasing hole 7 and phasing pin 7a. The latter is attached rigidly to spindle 6. Attached rigidly and concentrically to spindle 6 is worm 9. This drives worm gear 10 attached co-axially to leadscrew 11 which, in turn, by means of pawl 12, drives head carrier 13. The carrier moves radially inward along axis 14. Recording head 15 is rigidly attached to carrier 13 and contacts the back of disc 5 which is the surface to be recorded or played.

Not shown is the linear potentiometer attached to the frame of the machine and positioned by the radial position of head carrier 13 for purposes of varying the motor speed so as to keep the head-to-disc speed constant. This potentiometer is visible in FIG. 12.

It should be noted that this method of rim driving the disc has a very subtle advantage that could be of great use with larger or multiple-size discs. The same identical drive parts may be used to record with the same head-to-disc velocity on multiple size discs. This is because of the relation that to produce a head-to-disc velocity $V_R$ at a radius $R$ where the radius at the rim is Ro and the linear surface velocity imparted to the disc by the idler is $Vo$ results in $$V_R = (R)/(Ro)\ \mathrm{Vo}$$

For example, if at a radius of 0.4 inches or 80 percent of a 1 inch diameter disc and a head-to-disc velocity of 1.5 inches/seconds is desired, the surface velocity of the idler must be $(1.5)/(0.8) = 1.87$ inches/second. If, at 80 percent of a disc one foot in diameter, the same idler surface velocity is required, hence, the same parts will work.

Phasing

As set forth in the Dollenmayer "Driving" application, the disc is phased by means of a small hole 7 in the disc and pin 7a on the spindle (see FIG. 7). This establishes a predetermined relationship between the head and the disc.

Machines must be phased against a common standard if discs are to be taken from one and played on another, without any adjustments. This is accomplished when assembling the machines by means of a master disc with a prerecorded tone and a conventional cam surface acting on the end of the leadscrew to produce the necessary axial positioning. No further phasing of discs should be required when recorded and played on properly adjusted machines.

Head Carrier Design

Referring to FIGS. 8*a*, 8*b*, and 8*c*, the carrier consists of frame 13 with associated bearing 16 for free movement of the carrier along guide rod 14. The drive pawl that engages leadscrew 11, the head position indicator, and the manual scan lever is a single piece 17. The manual scan lever, head position indicator portion of piece 17*a* can also been seen in FIG. 1.

Magnetic head 15 is rigidly attached to head carrier frame 13. Adjustment screws to permit correct head alignment are not shown in order to simplify the sketch.

The reaction arm or pin which slides in a slot in the main machine frame on the back side of head carrier 13 is not shown. Its purpose, however, is to provide the reaction moment to counterbalance the applied moments about guide rod 14 due to the force between drive pawl 17*b* and leadscrew 11 and between magnetic head 15 and the disc (not shown).

In addition, the head carrier has attached to it a backspace assembly 18, 19, 20, and 21. Its operation will be explained in the next section.

Drive pawl 17 is pivoted on head carrier frame 13 about axis 30 that is parallel to guide rod 14. In the past, the drive pawl ordinarily has been in the plane of the guide rod, and thus, the pivot axis was normal to the guide rod axis. The latter design has the property that the pawl is self locking into the leadscrew in one direction but tends to cam itself out when motion occurs in the opposite direction. There must always be a fixed distance between the pawl pivot axis and the instantaneous centerline of the lead screw. If there is not, and all lead screws are eccentric to some degree, then there must be relative angular motion of the pawl to the leadscrew centerline. When this rotation occurs, it results in absolute axial motion of the head carrier along the guide rod. This deviation or pertubation, while not an accumulative error, results in a sporadic helical pattern rather than the true helical pattern that the recording head should be following. This is a pseudo-phasing error that cannot be tolerated in high density recordings as on the disc recorder.

In FIG. 8*a*, pawl pivot axis 30 is parallel to guide rod 14 and lead screw 11. It should be apparent that if leadscrew 11 is eccentric, and it will be, that, while the pawl must cam up or down to follow this motion, the pivoting of pawl 17 about axis 30 produces no motion of the head carrier in a direction parallel to the guide rod. Thus, eccentricities in the leadscrew are not translated into pseudo-phasing errors with this pawl scheme.

With this pawl scheme, manual scan lever 17*a*, head position indicator 17*a*, and pawl 17*b* are all a single piece. Usually these are separate pieces, hence, this pawl scheme results in fewer pieces.

Also, pawl 17 is held into engagement by spring 28 which is nearly concealed within a hollowed out portion of pawl 17. This spring portion can be seen in the sectioned view of 17 in FIG. 8.

Backspacing

Backspacing is accomplished on this machine by stepping the head carrier back one track on the leadscrew at a time.

A double lead leadscrew of 20 threads/inch is used. Thus, the actual pitch is 40 threads/inch. In other words, the drive pawl advances the head carrier one-twentieth of an inch or 0.050 inches for each revolution of the leadscrew. The reduction seen by the spindle or disc is 6 to 1 using a 24 tooth, quadruple lead worm and worm gear. Thus, the leadscrew turns only one-sixth of a revolution for each complete rotation of the disc. Consequently, the helical pattern generated on the disc by the recording head is one-sixth of one-twentieth of an inch or 0.0083 inches.

It is difficult to make a practical backspace in which the pawls mesh and drop properly in a leadscrew with a lead of only 0.0083 inches. Three times the lead or 0.025 inches seems to be the minimum lead that can be tolerated on the leadscrew and still insure reliable pawl design and meshing. As an example, this is what is used on the IBM Models 224 and 272 series dictating machines. By selecting a pitch of .025 inches for the leadscrew, a 3 to 1 reduction is necessary between the spindle and leadscrew when using a single lead leadscrew. However, a 6 to 1 worm reduction and a double lead leadscrew is used for space considerations. Without the use of the double lead leadscrew, six tracks would have to be backspaced.

Because the disc speeds up as it travels toward the inner tracks so as to keep the head-to-disc velocity constant, the backspace, in terms of time of recording reviewed, varies from about 14 seconds at the outer tracks to about 7 seconds at the innermost track.

In FIGS. 8*a*, 8*b*, and 8*c*, the backspacing mechanism attached to head carrier 13 consists of members 18, 19, 20, 21, and 23. The actual backspace pawl tip 19a does not normally engage the tooth in the leadscrew 11. Leaving the pawl out except when it is actually used has several advantages, the most important being that it cannot act as a secondary drive pawl tending to cause regular drive pawl 17 to not properly engage the leadscrew. Another advantage is that, when manually scanning, an additional mechanism is not needed to lift the pawl out. Also, the pawl does not have to be lifted out to add a forward spacing mechanism.

The assembly of the backspacing mechanism is quite simple. Member 18 is pivotally joined to head carrier frame 13 by shoulder screw 21. Member 19, which is the actual pawl, is pivotally attached to member 18 by means of second shoulder screw 20. Spring 23 which is attached to pin 24 on member 19 and to projection 13*a* on frame 13, serves a dual purpose. Notice that pin 24 has been deliberately positioned so as to be above pivot 21 but below pivot 20. This has the effect of causing a clockwise rotation of member 18 about pivot 21 and simultaneously causing a counterclockwise rotation of member 19 about pivot 20. Shoulder 18*a* serves as an upstop to restrict the rotation of member 18, and pin 25 serves as a downstop for member 19.

The backspace mechanism is activated by a simple bail, not shown, pushing downward at point 22 on member 18. FIG. 8*a* shows the mechanism in its normal position. Pushing down, at point 22, the entire backspace mechanism rotates as a unit about pivot 21 until pawl tip 19*a* contacts the leadscrew 11. This latter condition is shown in FIG. 8*b*. When this occurs, the instantaneous center of rotation of pawl 19 shifts to contact point 26 between pawl tooth 19*a* and leadscrew 11, and simultaneously the instantaneous center of member 18 shifts to pivot 20. The net result is that pivot 20 becomes essentially fixed relative to the leadscrew. Continued downward motion at point 22 thus causes pivot 21 and head carrier 13 to move to the right relative to leadscrew 11. This direction of motion is represented by arrow 27. FIG. 8c shows the final position of the head carrier. This new position is displaced from the original position by an amount equal to one tooth on the leadscrew or three recorded tracks on the disc.

During this portion of the backspacing operation, drive pawl 17 is cammed over the tooth in the leadscrew to the new position. This is possible because the drive pawl 13 is pivoted around axis 30 which is parallel to the leadscrew. When the drive pawl is pivoted normally to the leadscrew, the drive pawl must be lifted to get it over the tooth when backspacing.

The backspacing operation is completed by releasing the backspace bail which, in turn, allows the backspace assembly to restore itself to the configuration shown in FIG. 3a. It returns to this position because of the urging of spring 23 which causes member 18 to rotate clockwise and member 19 to rotate counterclockwise.

Disc Loading and Ejection

To insert a disc into the recorder, it is necessary to insert the new disc in the load slot (FIG. 9) only until it is flush with the side of the machine. The machine is then turned on in the listen mode. The disc is automatically pulled into the machine and phased. When phasing is completed and the machine is ready for recording, a red dot disappears in window 30.

To eject the disc, it is necessary to push manual scan lever 17a (FIG. 10) to the right as far as it will go and then push as far as it will go to the left. The disc will protrude from the load slot sufficiently that it can easily be grasped by the fingers and removed from the machine. The red dot will once again appear in window 30 and remain there until a new disc is loaded and phased. This eject procedure has also automatically restored the sound head back to the zero position.

FIG. 7 illustrates disc loading. Idler wheel 3 turns clockwise when looking at the mechanism. The action force of the idler wheel on the disc tends to pull the disc in the direction represented by arrow 31. If the disc is on spindle 6 it will rotate, but if it is not on the spindle, it tends to move without rotation in the direction 31. In this manner, the disc is pulled into the machine.

Figures 11, 12:
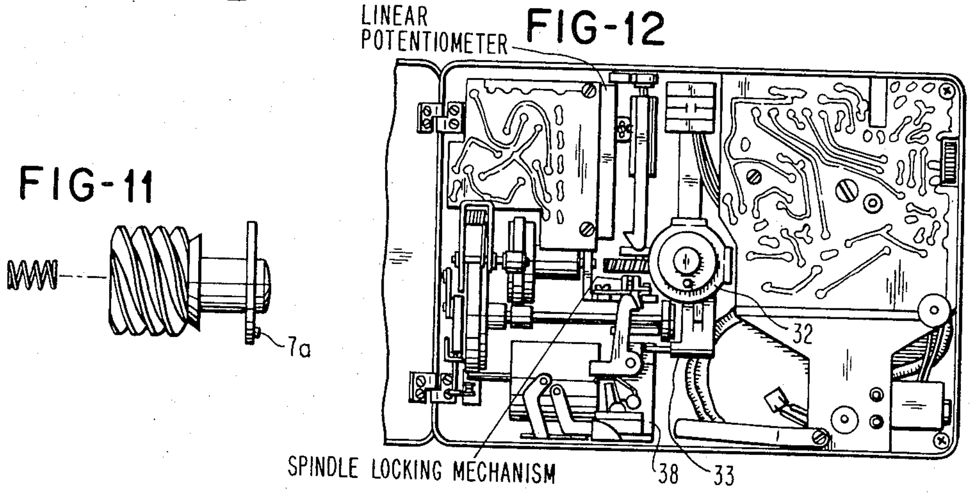

The disc is removed by simply pushing it out using a mechanism activated by the head carrier position. Before either loading or ejecting the disc, it must be separated from the spindle. This is accomplished by constructing the spindle so it can move vertically and having it spring biased upwardly. Referring to FIG. 11, a side view of the spindle, the side walls of the portion that engage the disc are tapered except for the last few thousandths of an inch. This has deliberately been done to allow the disc to drop onto the spindle easily with some misalignment but still register accurately when it is all the way on the spindle. Also, phasing pin 7a is somewhat below the top of the spindle. This is to permit the disc to drop onto the spindle in any angular position without interference. Once the disc is on the spindle, the spindle is constrained from rotating by mechanisms to be described later. As the disc is rotated and due to the upward spring biasing of the spindle, phasing pin 7a can now easily pop through the disc and then the spindle is free to move vertically into complete and intimate engagement with the disc. The disc is stripped from the spindle when ejecting the disc by lowering the spindle and using a fixed stripping ring surrounding the spindle. Ring 32 which is normally partially hidden can be seen in FIG. 12 which is a view with the pressure pad removed.

Figure 13A:
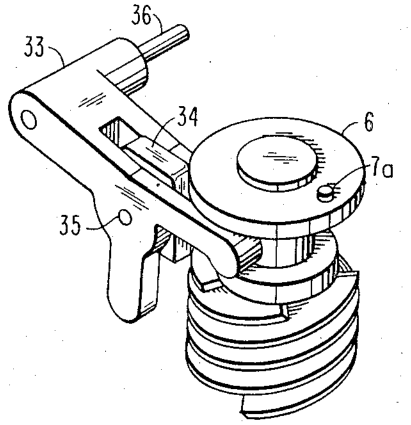
Figure 13B:
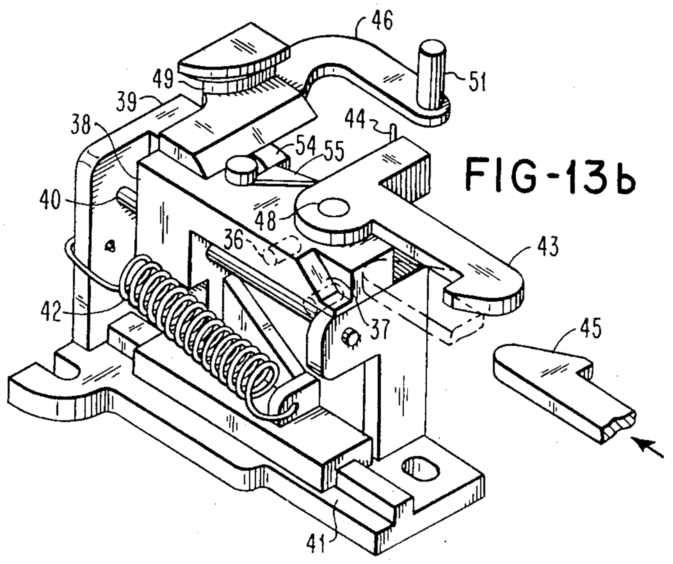

The mechanism that is used to depress the spindle and push the disc out of the machine is shown in FIGS. 13a and 13b. Spindle 6 is actually depressed by bellcrank 33 pivotally attached at 35 to a projection on machine frame 34. It is actuated by integral pin 36 that is in contact with a ramp or cam surface 37 on slidable member 38. The latter is slidably attached to subframe 39 by guide rod 40 and saddle bearing 41. How this moves can be seen by comparing FIGS. 13b and 13c. Spring 42 biases this member to the left which is away from the disc. Slidable member 38 and bellcrank 33 can be seen in FIG. 12 which gives an idea of their relative size and position in the machine.

Figures 13C, 13D:
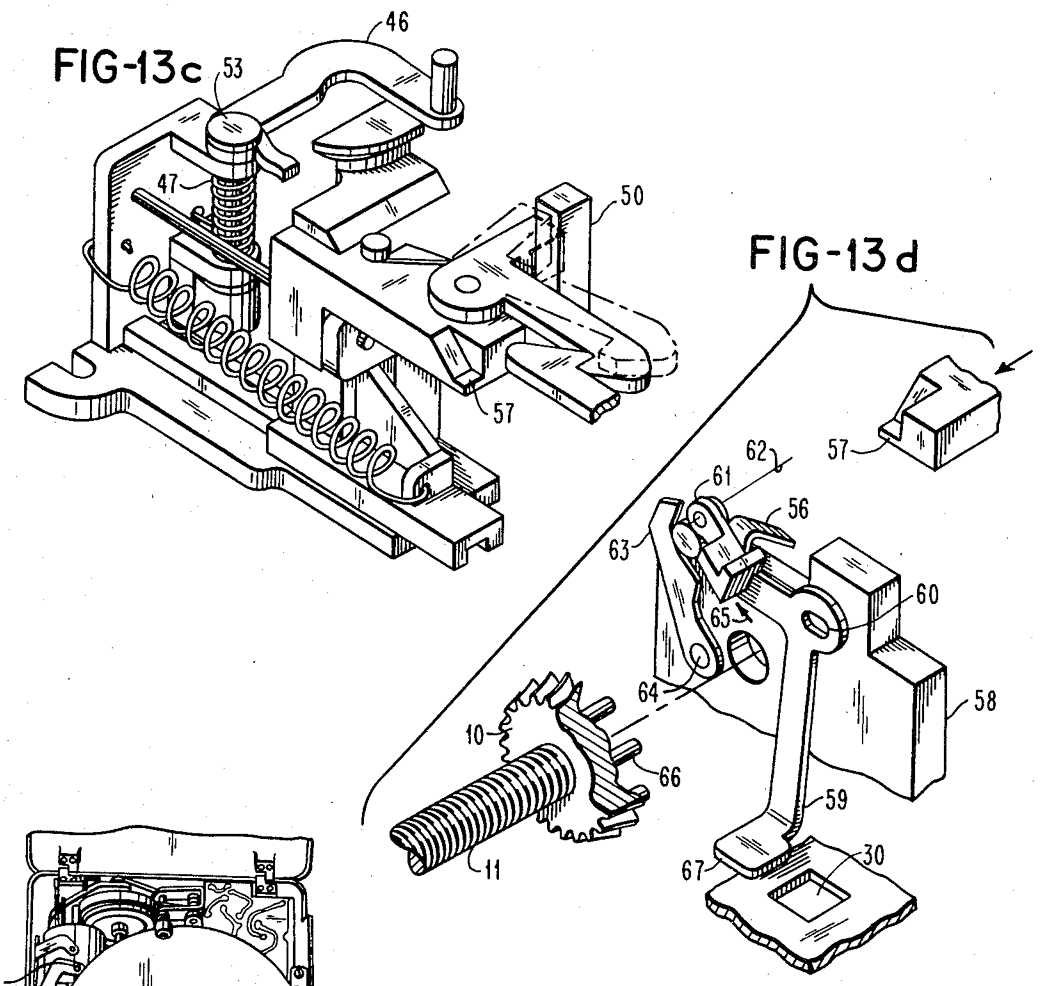

In FIGS. 13b and 13c, pawl member 43 is pivotally attached to member 38 at 48. It is spring biased clockwise by spring 44 against a stop (not visible) on slidable member 38. To start the disc ejection process, pawl 43 engages a complimentary pawl 45 on the head carrier frame when the head carrier is urged to the extreme end of its inner travel. Pulling the head carrier back toward the outside of the machine with member 43 and 45 engaged, member 38 is pulled to the position shown in FIG. 3c.

When member 43 and 45 first engage, pin 36 is at the bottom of ramp 37. As shown in FIG. 13b, the first part of the motion of member 38 causes pin 36 to be cammed up to the top of ramp 37 as is again shown in FIG. 13b. Thus, during the first portion of the eject cycle, pin 36 causes bellcrank 33 to cam spindle 6 down out of engagement with the disc. The disc is now free to be pushed out of the machine. How it is actually pushed out can be seen in FIG. 14. The actually pushing out of the disc is accomplished by curved shoulder 49 of slidable member 38 (see FIG. 13b).

As was stated previously, when ejecting a disc, the head carrier stays at the first track of the recording. In order to do this, slidable member 38 must be restored so that the next disc can be loaded into the machine. This is accomplished by having pawl 43 engage a fixed stop 50 (FIG. 13c) attached to the machine frame a short distance from the end of its travel. The effect is that it causes pawl 43 to rotate out of engagement with head carrier pawl 45. Spring 42 then restores the slidable member back to the position shown in FIG. 13b. In this intermediate position, pin 36 is still at the top of ramp 37 and spindle 6 remains depressed so the next disc can be loaded. The sudden release of the reaction force of pawl 43 on pawl 45 results in an unbalanced force condition on the head carrier. The result is that the head carrier is automatically accelerated to the zero position before the dictator could possible stop pushing on the head carrier. This completes the ejection of the disc.

When loading, the disc is inserted into the load slot and pushed in flush with the side of the machine. The disc can be inserted because the spindle is still being held down. When the disc is flush with the side of the machine, the geometry of the machine is such that the disc is under the pinch roller. The machine is now put in the Listen mode. This causes the disc to be pulled into the machine by the action force of idler wheel 3, FIG. 7, on the disc. Referring to FIG. 14 and FIG. 13*b*, pin 51 is so positioned that before the disc center hole passes over the approximate center of the spindle, it contacts the disc. Under the urging of the linear motion of the disc, pin 51, which is rigidly attached to arm 46, (pivotally attached to subframe 39 at 53) is rotated counterclockwise sufficiently that latch surface 54 disengages from slidable member 38. When this occurs, slidable member 38 is forced by spring 42 to pull back sufficiently so that shoulder 49 can no longer touch the disc, and pin 36 moves down ramp 37 so that spindle 6 is released and is free to move up and engage the disc. Latch surface 54 and arm 46 engage cam surface 55 on slidable member 38. This has the effect of causing arm 46 to rotate counterclockwise a sufficient amount so that pin 51 no longer contacts the disc. Spring 47 biases arm 46 so that it will snap into the detent position shown in FIG. 13*b* the next time a disc is ejected.

Now with the spindle free and biased upward, the spindle drops through the center hole in the disc as the latter is pulled into the machine under the urging of the action force from the idler wheel. When this occurs, the disc begins to rotate until the phasing hole in disc 7 engages phasing pin 7*a* on the spindle, and the spindle is free to "pop" into its final and intimate engagement with the disc. When this occurs, the disc is loaded and the machine is ready to be used.

Spindle Lock and Phasing Indicator

One thing necessary when the disc is phasing is that the spindle be prevented from rotating so the disc can "look for" phasing pin 7*a* on spindle 6 (see FIG. 13a). It cannot depend on the inherent rotational friction in the spindle to be large enough to prevent its turning. The mechanism shown in FIG. 13*d* is attached to a vertical surface of the main frame and directly adjacent to worm gear 10 which drives leadscrew 11. It is designed to lock the spindle against rotation until a preset torque is exceeded. The preset torque is that torque that the disc can transmit to the spindle once the disc is phased without the drive slipping.

The mechanism consists of member 59 pivoted about axis 60. Attached to axis 60 is a second member 61. Member 61 is spring biased clockwise by a very light hair spring not shown. This combination is held in either of two stable states by detent arm 63 that is pivoted at 64 and spring biased clockwise by a hair spring not shown. This combination of elements 59 and 61 is automatically rotated to its counterclockwise position by surface 57 on slidable member 38 contacting ramp 56 on member 59 when the disc is ejected from the machine. This causes two things to occur: member 61 is lowered enough that if the spindle tries to rotate there is interference with one of the plurality of co-axial equally spaced pins 66 attached to worm gear 10. The direction of the resulting action force on member 61 is represented by force vector 65. The second thing that occurs is that a portion 67 of member 59 that has been painted bright red moves in front of window 30 in the front cover of the machine.

This mechanism will not release and return to the state shown in FIG. 13*d* until preload force 65 is exceeded. Force 65 must be applied by spindle 6 and preset to be less than the maximum force that the spindle is capable of transmitting without slipping. This force obviously, due to the disc hole spindle design, cannot be present until phasing pin 7*a* has engaged phasing hole 7 in the disc. When this occurs, force 65 causes the combination of elements 60 and 61 to shift to the other stable position. This is the position shown in FIG. 13*d*. Member 61 no longer interferes with pins 66 on the worm gear, and the bright red portion 67 is no longer visible through window 30 in the front cover. There now is absolutely no drag whatsoever on the spindle from this mechanism.

In this manner, the mechanism locks the spindle so the disc can be phased. Further, a visible indication is made of whether or not phasing has occurred.

Disc Storage

In the back cover and in accordance with the present invention, there is a mechanism for the storage and separation of unrecorded and recorded discs. This mechanism is visible in FIG. 2*c*.

The discs are loaded into and ejected out of a common slot in the bottom of the machine. The unrecorded discs are ejected one at a time by the user sliding a finger across the opening in the back cover as shown in FIG. 15.

A recorded disc or discs are stored by pushing them back in the same slot the unrecorded disc or discs came out.

The number of discs in storage and whether they are recorded or not is easily determined by moving button 69 forward (see FIG. 16). This ejects all the discs in storage sufficiently for visual inspection. The unrecorded discs are on top and are separated from the recorded discs which are on the bottom below the spring metal separator, 70.

The present storage device holds about one dozen discs which is more than an hour's recording. When the unrecorded discs have all been used, the word "Empty" appears in the opening in the back cover.

A view of the movable part of the storage device is shown in FIG. 17. FIG. 18 is a cross-sectional view of the storage device with an enlarged view of the tip.

Stripper 71 on the end of spring steel slide 70 permits only one disc to move forward and the rest are held back. Dimple 72 on slide 70 serves two purposes: One, it tends to hold the recorded discs in place under the slide, and two, it acts as a fulcrum when pressed to eject a disc and to force the stripper up against the cover to insure reliable operation.

Stripper 71 cams the recorded discs that are reinserted into the storage slot to always feed to the lower portion below spring 70 and thus be always separated from the unrecorded discs.

Pressure Pad Design

The design shown in FIG. 19 is a simple fixed U-channel that extends from the outside to the inside track on the disc. It gives a controlled curvature of the disc at the point of head contact. This is essential for good head contact. The head pressure force comes entirely from the bending stiffness of the disc. In addition, there is no contact between the head and pressure pad with the disc not in the machine. Thus, there is no possibility that the head can be scratched accidently when manually scanning with no disc in the machine. Also, it makes possible a much easier loading of the disc because the disc can "slip by" by the head much easier than when a conventional felt pressure pad is used. Another advantage of this scheme is that the metal U-channel tends to bleed off electrostatic charges from the disc and not tend to generate them as felt will do.

A combination pad such as shown in FIG. 20 with felt and the U-channel works better than the U-channel alone, especially with dirty discs. The curvature of the disc is used as the primary loading on the head. The felt is not exerting the force that it would if it were used alone.

While the invention has been particularly shown and described with reference to several embodiments, it will be understood by those skilled in the art that various changes in form and detail may be made without departing from the spirit and scope of the invention.

What is claimed is:

1. A dictation unit accommodating each of a plurality of record members for transducing of signals thereon, said dictation unit having a main housing containing the major components thereof, and further comprising:

a record member storage area integrally formed in said housing for storing record members when not actively in use in said dictation unit;

movable separator means in said record member storage area defining a first compartment for storing unrecorded record members and defining a second compartment for storing recorded record members;

deflection means on said separator means operative to deflect a recorded record member inserted into said storage area into the recorded record member compartment; and guide means in said record member storage, said guide means mounting said separator means for reciprocation to and from an internal home position and an external extended position to enable movement of all unrecorded record members or recorded record members stored in said storage area outwardly from said storage area for visual inspection by a user of said unit.

2. The apparatus of claim 1, wherein said record members comprise individual discs, and further comprising:

stripper means incorporated in said separator means, said stripper means being formed to enable movement of only one unrecorded disc outwardly from said storage means; and a cam element incorporated in said deflection means arranged for engagement with reinserted discs to guide said reinserted discs into the second compartment of said storage means.

* * * * *